US007957486B2

(12) United States Patent
Petrus et al.

(10) Patent No.: US 7,957,486 B2
(45) Date of Patent: Jun. 7, 2011

(54) TRANSMISSION LINK ADAPTATION

(75) Inventors: Paul Petrus, Santa Clara, CA (US);
Stephen D. Fleischer, Mountain View, CA (US); Sundar G. Sankaran, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 2709 days.

(21) Appl. No.: 10/262,422

(22) Filed: Sep. 30, 2002

(65) Prior Publication Data
US 2004/0063406 A1    Apr. 1, 2004

(51) Int. Cl.
*H04L 27/04* (2006.01)
(52) U.S. Cl. ........................................ 375/295
(58) Field of Classification Search .................. 375/295, 375/358, 316, 219; 455/67.1, 67, 3, 442, 455/436, 67.3, 63.1, 69; 370/331, 332, 465
See application file for complete search history.

(56) References Cited

U.S. PATENT DOCUMENTS

| | | | |
|---|---|---|---|
| 5,991,618 A | 11/1999 | Hall | |
| 6,108,560 A | 8/2000 | Navaro et al. | |
| 6,122,293 A | 9/2000 | Frodigh et al. | |
| 6,167,031 A | 12/2000 | Olofsson et al. | |
| 6,167,060 A | 12/2000 | Vargo et al. | |
| 6,389,066 B1 | 5/2002 | Ejzak | |
| 6,452,941 B1 | 9/2002 | Bruhn | |
| 6,683,916 B1 * | 1/2004 | Sartori et al. | 375/295 |
| 6,771,965 B2 * | 8/2004 | Hamabe | 455/442 |
| 6,879,840 B2 * | 4/2005 | Razavilar et al. | 455/522 |
| 6,930,981 B2 * | 8/2005 | Gopalakrishnan et al. | 370/252 |
| 2001/0053971 A1 | 12/2001 | Demetrescu et al. | |
| 2002/0110138 A1 * | 8/2002 | Schramm | 370/430 |
| 2002/0183010 A1 * | 12/2002 | Catreux et al. | 455/67.1 |
| 2005/0031019 A1 * | 2/2005 | Itoh | 375/142 |

FOREIGN PATENT DOCUMENTS

| | | |
|---|---|---|
| EP | 1128577 A1 | 8/2001 |
| EP | 1 209 838 | 5/2002 |
| EP | 1207645 A1 | 5/2002 |
| GB | 2349042 | 10/2000 |
| JP | 2003-324382 | 11/2003 |
| WO | WO 00/49760 | 8/2000 |
| WO | WO03034677 A1 | 4/2003 |
| WO | PCT/US03/29894 | 2/2004 |

OTHER PUBLICATIONS

Sankaran et al—U.S. Appl. No. 10/359,354, filed Feb. 5, 2003—Messaging for Transmission Link Adaptation.
"FOA Mailed May 16, 2007 for U.S. Appl. No. 10/359,354", Whole Document.
"ISR Mailed Feb. 4, 2004 for PCT/US03/29895", (Feb. 4, 2004), Whole Document.

(Continued)

*Primary Examiner* — Khai Tran
(74) *Attorney, Agent, or Firm* — Blakely, Sokoloff, Taylor & Zafman LLP

(57) ABSTRACT

According to an embodiment of the invention, a method and apparatus are described for transmission link adaptation. In one embodiment of the invention, data is obtained regarding a quality of a transmitted signal. Data is obtained regarding available power for transmission. A transmission mode is selected based at least in part on the quality of the transmitted signal and on the available power for transmission.

66 Claims, 4 Drawing Sheets

OTHER PUBLICATIONS

"OA Mailed Jan. 30, 2006 for U.S. Appl. No. 10/359,354", Whole Document.

"OA mailed Apr. 4, 2005 for U.S. Appl. No. 10/359,354", Whole Document.

European Office Action as received on Dec. 8, 2009 in related EP Application No. 037520568.0, 5 pages.

Japanese Final Office Action English Language Translation as received on Mar. 1, 2010 in related JP Application No. 2004-541604, 2 pages.

Office Action for Korean Application No. 10-2005-7005536 mailed May 3, 2010.

Non-final Office Action for Japanese Patent Application No. 2004-541604 mailed Apr. 25, 2009.

Final Office Action for Japanese Patent Application No. 2004-541604 mailed Aug. 10, 2010.

Examination Report for Australian Patent Application No. 2003270855 mailed Nov. 7, 2008.

Notice of Allowance for Australian Patent Application No. 2003270855 puslibhsed Jan. 28, 2010.

* cited by examiner

TRANSMISSION LINK ADAPTATION

FIELD OF THE INVENTION

The invention relates generally to the field of wireless communications. More particularly, the invention relates to adaptation of transmission links.

DESCRIPTION OF THE RELATED ART

In wireless communications, the performance of a system is dependent on the quality of the propagation channel. Communications systems may support variable data rate services to allow for changing propagation conditions. To vary data rates, different transmission modes may be implemented based on the conditions. When channel conditions are relatively good, higher order transmission modes may be used. If channel conditions become poor, the transmission mode may be changed to a lower order transmission method.

The method by which a transmission method is chosen is important in maintaining efficiency in transmission. Conventional communications systems do not use all available information in selecting transmission modes, and conventional systems thus may not make optimal transmission mode selections.

BRIEF SUMMARY OF THE INVENTION

A method and apparatus are provided for transmission link adaptation. According to an embodiment of the invention, a method and apparatus are described for transmission link adaptation. In one embodiment of the invention, data is obtained regarding a quality of a transmitted signal. Data is obtained regarding available power for transmission. A transmission mode is selected based at least in part on the quality of the transmitted signal and on the available power for transmission.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements, and in which.

DETAILED DESCRIPTION OF THE INVENTION

Overview

An embodiment of the present invention provides for transmission link adaptation. A signal is transmitted by a radio unit and information regarding the quality of the transmitted signal such as SINR (signal to interference plus noise ratio) is obtained. Information regarding available transmission power is also obtained. A transmission mode is selected from a set of transmission modes, with each of the transmission modes being a combination of a modulation scheme and a coding method and being mapped to a band of signal qualities. An estimate is made regarding how much the signal quality can be modified using the available transmission power. The selection of the transmission mode is based at least in part on the information regarding the signal quality and the information regarding the available transmission power.

In one embodiment, it is contemplated the invention is implemented in a TDD (time division duplex) high bandwidth wireless data and voice system, such as ArrayComm's i-BURST (TM) system. However, it should be appreciated the invention is not limited to the i-BURST system or any other particular air interface, and in fact it should become apparent from the description herein that the invention may find use with a variety of air interface protocols and communications systems.

Messaging

The present invention will generally be described in the context of a base station and a remote terminal. The base station transmits downlink data bursts and the remote terminal transmits uplink data bursts. However, the invention is not limited to systems with base stations and remote terminals or to uplink and downlink data transmissions. The remote terminal transmits information regarding the current transmission mode (also referred to as a modulation class or mod class) being used by the remote terminal and the available transmission power of the remote terminal. The available transmission power is the difference between the maximum transmission power and the current transmission power. However, transmission power information may be transmitted in various other forms. The base station transmits information regarding the current transmission mode of the base station and a recommended transmission mode for the remote terminal.

Varying messages communicated between a base station and a remote terminal, including utClass, modClassUp, and modClassDown, can be used to set or change the modulation class used for transmitting uplink or downlink data bursts. Alternatively, a FACCH (fast access control channel) or another form of message can be used to set or adjust the modulation class.

Figure 1:
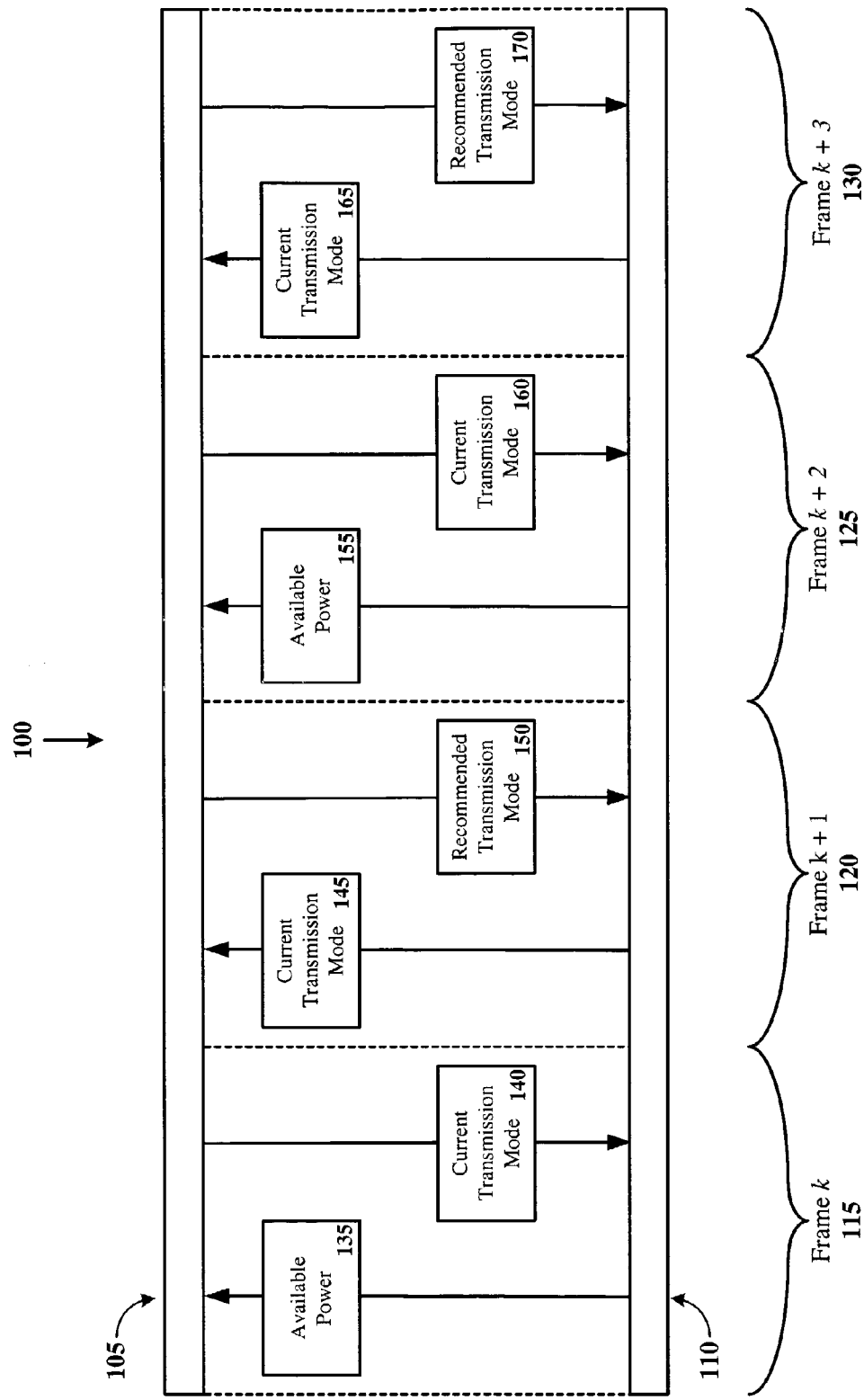
FIG. 1 is an illustration of communications between a first device and a second device under an embodiment of the invention.

FIG. 1 is a simplified illustration of a series of transmissions between radio units in an embodiment of the invention. As noted further below, the order of the transmissions may vary in different embodiments of the invention. In the illustration, the transmission sequence 100 between a first radio unit 105 and a second radio unit 110 includes an uplink transmission and a downlink transmission in each of a number of transmission frames. The first radio unit may include a base station and the second radio unit may include a remote terminal, but the radio units are not limited to these particular examples. The transmission frames illustrated are an initial frame, frame k 115, and the following or succeeding frames, frame k+1 120, frame k+2 125, and frame k+3 130.

In the uplink transmission 135 of frame k 115, information regarding the available power of the second radio 110 is transmitted to the first radio 105. In the downlink transmission 140 of frame k 115, information regarding the current transmission mode of the first radio unit 105 is transmitted to the second radio unit 110. In frame k+1 120, the current transmission mode of the second radio unit 110 is transmitted in the uplink 145 and a recommended transmission mode for the second radio unit 110 is transmitted in the downlink 150.

Uplink 155 and downlink 160 of frame k+2 125 and uplink 165 and downlink 170 of frame k+3 130 then repeat the pattern of the frame k 115 and frame k+1 120.

In a first embodiment of the invention, the available power of a remote terminal is provided to a base station in the uplink transmission of a first transmission frame. In the downlink transmission of the first transmission frame, the base station transmits the current transmission mode of the base station. The current transmission mode may be the transmission mode used by the base station for the current frame and the next or succeeding frame, but this may vary in other embodiments. In a second embodiment of the invention, the available power of the remote terminal is provided to the base station in the uplink transmission of a first transmission frame, and in the downlink transmission of the first transmission frame, the base station transmits a recommended transmission mode for the remote terminal. The recommended transmission mode is based at least in part on the available power information provided by the remote terminal.

In the first embodiment of the invention, in the uplink transmission of a second frame, the remote terminal transmits the current transmission mode of the remote terminal. The current transmission mode may be the transmission mode used by the base station for the current frame and the succeeding frame, but this may vary in other embodiments. In the downlink transmission of the second frame, the base station transmits the recommended transmission mode for the remote terminal. In the second embodiment of the invention, the uplink transmission includes a current uplink transmission mode and the downlink includes a current downlink transmission mode.

In an embodiment of the invention, the base station selects a transmission mode for the base station. Information regarding the chosen transmission mode is transmitted to the remote terminal as the current transmission mode for the base station. The remote terminal then uses the current transmission mode to decode data transmissions from the base station. The base station also selects a recommended transmission mode for the remote terminal and transmits the recommended transmission mode to the remote terminal. The remote terminal modifies the transmission mode of the remote terminal based at least in part upon the recommended transmission mode and transmits information regarding the current transmission mode to the base station. The base station then uses the current transmission mode of the remote terminal to decode data transmissions from the remote terminal. The remote terminal and base station then continue this process to establish modified transmission modes as conditions change.

In one example, a remote terminal transmits information regarding the available power of the remote terminal in the uplink of a first frame, and the base station transmits the current transmission mode of the base station in the downlink of the first frame. In a second frame, the remote terminal transmits the current transmission mode of the base station in the uplink and the base station transmits a recommended transmission mode in the downlink. This process then repeats. As a result, there is a time period of a downlink transmission and an uplink transmission between the transmission of the available power of the remote terminal and the transmission of the recommended transmission mode, allowing a time period for determination of the recommended class. In addition, there is one frame between the transmission of the recommended transmission mode and the next transmission of the current transmission mode for the remote terminal. Therefore, the remote terminal has one frame to react to the recommendation and modify the transmission mode of the remote terminal based at least in part on the recommended transmission mode.

In an embodiment of the invention involving a first radio unit and a second radio unit, the intelligence needed to perform link adaptation for both radios is only necessary in one of the radio units. As such, the second radio unit may be simplified. If software or hardware upgrades relating to the transmission mode adaptation process are implemented, the implementation may only be required in the intelligent radio that provides link adaptation both for itself and for the other radio unit.

Link Adaptation

In an embodiment of the invention, a wireless data system uses multiple transmission modes, with each transmission mode (also referred to as a modulation class or mod class) including a combination of a modulation scheme and a coding scheme. The transmission mode may also include puncturing and other factors. The transmission mode used by a radio unit may be changed based upon the conditions of the propagation channel and available transmission power. Link adaptation may be used to maximize the throughput of data transmission as it is restrained by the quality of the transmission channel. Link adaptation for a transmission may be performed by either the transmitting radio unit or the receiving radio unit.

The suite of mod classes available for link adaptation may allow operation over a span of signal qualities. Each mod class is assigned to a band of signal qualities. Signal qualities may be evaluated using a variety of different quality measures. In one embodiment, the signal quality is evaluated using signal to interference plus noise ratio, thereby allowing rapid evaluation of signal quality. Signal quality may be expressed as the difference between a measured signal quality and a target signal quality.

A list of mod classes may be ordered such that the redundancy in coding decreases through the list. For example, the mod class with the lowest redundancy can be at the highest point in the list. This mod class can be used for conditions with the highest relative signal qualities. The mod class at the highest point in the list will also generally have the highest modulation scheme, such as 24-QAM (quadrature amplitude modulation). The mod class at the lowest point in the list, for conditions with the lowest signal qualities, then may have the highest redundancy and the lowest modulation scheme, as BPSK (binary phase-shift keying). If SINR is used to evaluate signal quality, the highest mod class would be used for signals with the highest SINR values and the lowest mod class would be used for signals with the lowest SINR values. Intermediate mod classes may be chosen to span the signal qualities between the highest mod class and the lowest mod class. The intermediate mod classes may be chosen to be equally spaced over the span of signal qualities.

In one embodiment of the invention, mod classes are mapped to SINR values so as to obtain a certain frame error rate (FER) in each mod class. For example, the mod classes may each result in an FER of approximately one percent.

The modulation classes provide different types of modulation and coding which together vary the number of bits per symbol. The modulation classes can be selected based on terminal capabilities, channel quality, data queue length, or a variety of other factors. The modulation classes can be changed in any number of different ways. The particular number and type of modulation classes can take many different forms as appropriate to accommodate network capacities, channel quality, and cost targets.

Figure 2:
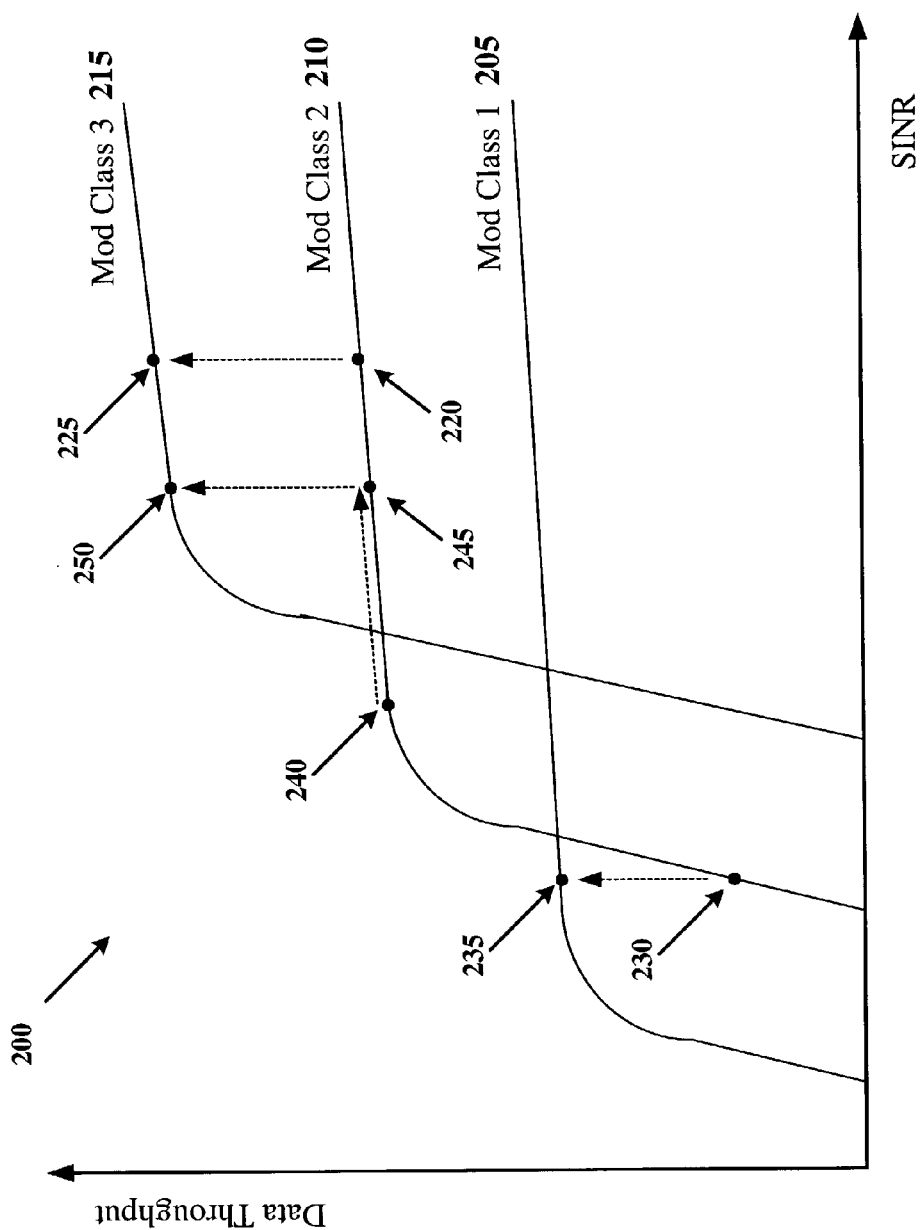
FIG. 2 is a graph illustrating link adaptation in an embodiment of the invention.

FIG. 2 is a graphical illustration of transmission mode operation. In the graph 200, the throughput that is achieved at various SINR values is shown for varying mod classes. FIG. 2 is intended for the purpose of illustration, and is not drawn to scale and does not necessarily reflect actual values. In this illustration, the mod classes are graphed according to data throughput on a first axis and SINR on a second axis. For data throughput, each mod class curve rises steeply as SINR is increased and then levels out to a gradual increase. However, the curve for each individual mod class is dependent on the actual modulation and coding schemes that are used and may not be represented by the curves shown in FIG. 2. The Mod Class 1 curve 205 is the lowest mod class shown, requiring the lowest SINR and generally providing the lowest data throughput. The Mod Class 3 curve 215 represents the highest of the three mod classes, requiring the highest STNR values and generally providing the highest data throughput. The Mod Class 2 curve 210 represents an intermediate mod class. As seen in FIG. 2, a greater throughput may be obtained by changing to a higher or lower mod class, depending on the SINR value. The most desirable operation for data throughput at a given SINR is the highest mod class curve for the SINR value. In addition there are advantages to operating on the gradually increasing upper portion of a mod class curse, as opposed to the rapidly increasing lower portion of a mod class curve. In a first example, a radio device operating at point 220 on the upper portion of the Mod Class 2 curve 210 may be changed to the Mod Class 3 at point 225 on the upper portion of the Mod Class 3 curve 215, thereby increasing the data throughput. In a second example, a radio device operating at point 230 in the lower portion of the Mod Class 2 curve 210 can increase throughput by lowering the mod class to point 235 on the upper portion of Mod Class 1 curve 205.

In an embodiment of the invention, available transmission power may be used in conjunction with signal quality to select the mod class, and thereby potentially increasing the data throughput of signal transmission and increasing the flexibility of the system. For example, a radio unit may be operating using Mod Class 2 at point 240 on the upper portion of the Mod Class 2 curve 210. An increase in transmission power generally results in an increase in SINR. The radio unit may estimate the change in signal quality that will result from a change in transmission power, as limited by the available transmission power. If the available transmission power is sufficient to increase the SINR to point 245, then the data throughput may be further increased by changing from Mod Class 2 to Mod Class 3 at point 250 on the upper portion the Mod Class 3 curve 215. The examples provided here demonstrate instances in which the data throughput may be increased. However, many other factors may be included in the determination of which mod class is chosen.

In one embodiment, there are nine different predetermined modulation classes as shown in Table 1. The different modulation classes differ in modulation scheme as well as in encoding. The encoding can include error detection and correction, puncturing, block coding, and block shaping. Other types of modulation and encoding can be used depending on the needs of a particular application. The bit per symbol rates are approximate in Table 1 but provide an indication of a range of data rates that can be accomplished using the same number of symbols. Using values of 182 uplink and 460 downlink information symbols per burst, a modulation class 0 burst would carry 91 or 230 bits, respectively. A modulation class 8 burst, on the other hand, carries 728 and 1840 bits, respectively.

TABLE 1

Modulation Classes

| Mod Class | Bits/Sym | Bits/Uplink Burst | Bits/Downlink Burst | Signal Set |
|---|---|---|---|---|
| 0 | 0.5 | 91 | 230 | BPSK |
| 1 | 0.67 | 121 | 308 | BPSK |
| 2 | 1.0 | 182 | 460 | QPSK |
| 3 | 1.5 | 273 | 690 | QPSK |
| 4 | 2.0 | 364 | 920 | 8-PSK |
| 5 | 2.5 | 455 | 1150 | 8-PSK |
| 6 | 3.0 | 546 | 1380 | 12-QAM |
| 7 | 3.5 | 637 | 1610 | 16-QAM |
| 8 | 4.0 | 728 | 1840 | 24-QAM |

The modulation classes can also be adjusted to achieve a particular data rate ratio between uplink and downlink, as well as to accommodate the greater capabilities of a base station as compared to a remote terminal. In an example, the ratio of downlink symbols per uplink symbol is approximately 2.5:1. This is believed to be a practical data rate ratio for many Internet applications. If the base station and the remote terminal use the same modulation class, then the data rate ratio will also be about 2.5:1. However, by using different modulation classes, the data rate ratio can be varied between about 0.32:1 (remote terminal at mod class 8, base station at mod class 0) to about 20:1 (remote terminal at mod class 0, base station at mod class 8). In some applications, the base station may frequently transmit all user data using a modulation class that is one step higher than the remote terminal. This provides a data rate ratio between 2.9:1 to 3.8:1. As can be seen, the modulation classes provide a great amount of flexibility in setting the operating parameters of the system.

Another factor that may be considered is that the lower modulation classes generally require less energy to transmit and cause less interference with other users at a base station. Accordingly, the system can be configured to prefer lower modulation classes. On the other hand, the higher modulation classes transmit at higher data rates so that data buffers will be emptied sooner. For many types of data transfer, the higher data rate will mean shorter sessions so that more users can be accommodated. If a user is sending and receiving E-mail, for example, a higher data rate will transfer the E-mail faster, allowing the data transfer to be closed more quickly and making the system resources available to another user.

The selection of mod classes may depend not only on the amount of data to be transferred but the relative amount in each direction. If the data to be transferred in one direction is much less than the data to be transferred in the other direction, then the direction with the lesser amount of data can be operated at a much lower modulation class. Since the data transfer will remain open until the larger data buffer is empty, this will not delay closing the data transfer.

The modulation classes are mapped to signal qualities, such as signal to noise ratio. Table 2 illustrates exemplary mod classes established for an uplink transmission, with nominal target SINR values for each mod class. Table 2 illustrates exemplary mod classes established for a downlink transmission, with nominal target SINR values for each mode class. As shown in Tables 2 and 3, the mod classes used and the target signal qualities may vary between the uplink and downlink transmissions.

TABLE 2

Nominal Uplink Target SINR's

| Mod Class | SINR Target (dB) |
|---|---|
| 0 | 2.2 |
| 1 | 3.8 |
| 2 | 5.5 |
| 3 | 8.4 |
| 4 | 10.6 |
| 5 | 12.9 |
| 6 | 14.9 |
| 7 | 16.2 |

TABLE 3

Nominal Downlink Target SINR's

| Mod Class | SINR Target (dB) |
|---|---|
| 0 | 2.5 |
| 1 | 4.3 |
| 2 | 5.8 |
| 3 | 8.7 |
| 4 | 10.9 |
| 5 | 13.1 |
| 6 | 15.2 |
| 7 | 16.5 |
| 8 | 18.4 |

Base Station Structure

Figure 3:
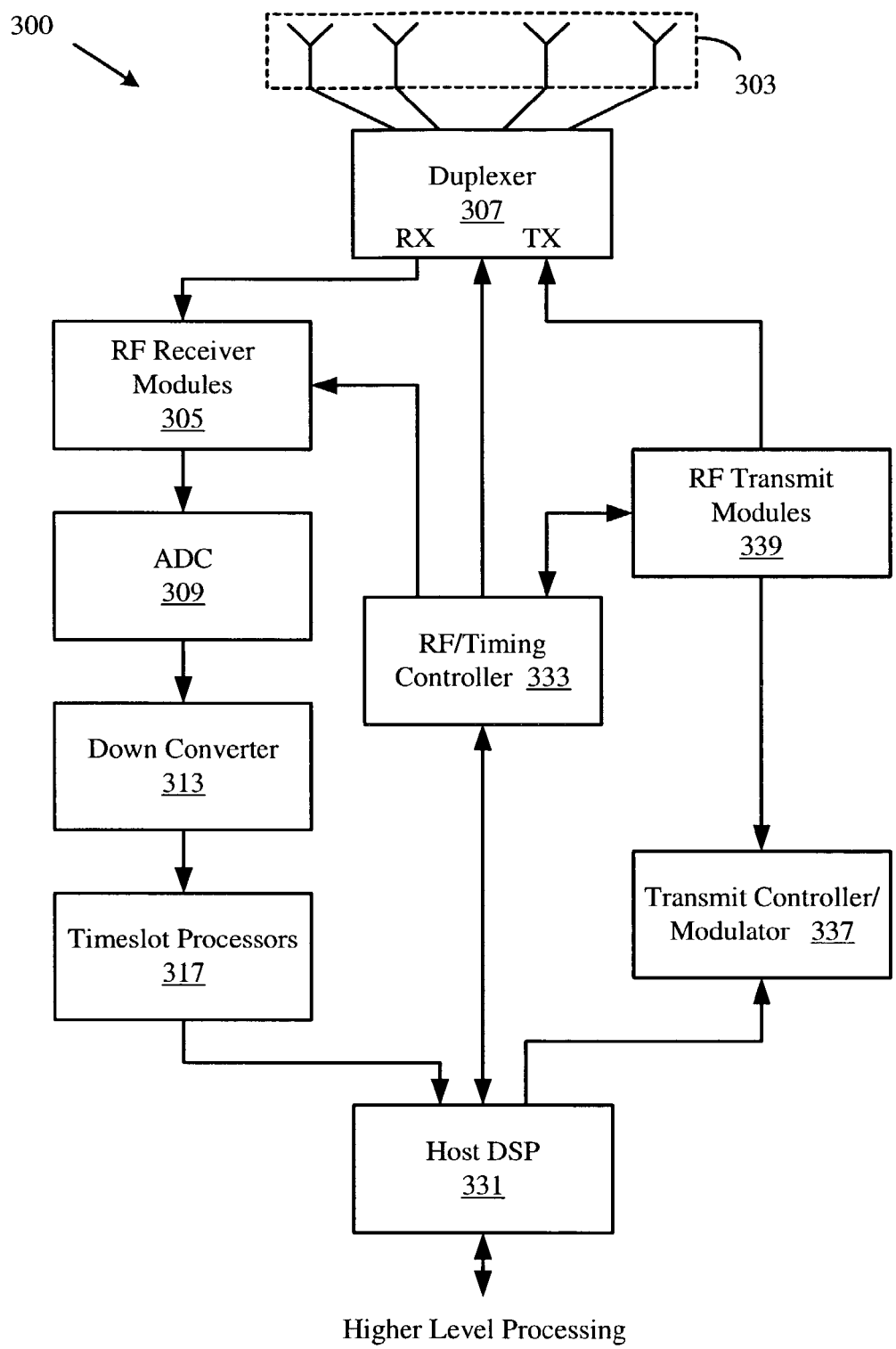
FIG. 3 is a simplified block diagram illustrating a base station on which an embodiment of the invention can be implemented.

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 3 shows an example of a base station 300 of a wireless communications system or network suitable for implementing the present invention. The system or network includes a number of subscriber stations, also referred to as remote terminals or user terminals, such as that shown in FIG. 4. The base station 300 may be connected to a wide area network (WAN) through its host DSP 331 for providing any required data services and connections external to the immediate wireless system. To support spatial diversity, a plurality of antennas 303 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 331 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station 300 to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. Nos. 5,828,658, issued Oct. 27, 1998 to Ottersten et al. and 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 307, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 305, and are converted down in analog by RF receiver ("RX") modules 305 from the carrier frequency to an intermediate frequency ("IF"). This signal then is digitized (sampled) by analog to digital converters ("ADCs") 309. Final down-converting to baseband is carried out digitally. Digital filters can be used to implement the down-converting and the digital filtering, the latter using finite impulse response (FIR) filtering techniques. This is shown as block 313. The invention can be adapted to suit a wide variety of RF and IF carrier frequencies and bands.

There are, in the present example, eight down-converted outputs from each antenna's digital filter 313, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 317 (hereinafter "timeslot processor") for further processing, including calibration, according to one aspect of this invention. Eight Motorola DSP56300 Family DSPs can be used as timeslot processors, one per receive timeslot. The timeslot processors 317 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 317 is demodulated burst data for each of the eight receive timeslots. This data is sent to the host DSP processor 331 whose main function is to control all elements of the system and interface with the higher level processing, which is the processing which deals with what signals are required for communications in all the different control and service communication channels defined in the system's communication protocol. The host DSP 331 can be a Motorola DSP56300 Family DSP. In addition, timeslot processors send the determined receive weights for each remote terminal to the host DSP 331. The host DSP 331 maintains state and timing information, receives uplink burst data from the timeslot processors 317, and programs the timeslot processors 317. In addition it decrypts, descrambles, checks error correcting code, and de-assembles bursts of the uplink signals, then formats the uplink signals to be sent for higher level processing in other parts of the base station 300. Furthermore DSP 331 may include a memory element to store data, instructions, or hopping functions or sequences. Alternatively, the base station 300 may have a separate memory element or have access to an auxiliary memory element. With respect to the other parts of the base station 300 it formats service data and traffic data for further higher processing in the base station 300, receives downlink messages and traffic data from the other parts of the base station 300, processes the downlink bursts and formats and sends the downlink bursts to a transmit controller/modulator, shown as 337. The host DSP also manages programming of other components of the base station 300 including the transmit controller/modulator 337 and the RF timing controller shown as 333.

The RF controller 333 reads and transmits power monitoring and control values, controls the duplexer 307 and receives timing parameters and other settings for each burst from the host DSP 331.

The transmit controller/modulator 337, receives transmit data from the host DSP 331. The transmit controller uses this data to produce analog IF outputs which are sent to the RF transmitter (TX) modules 339. Specifically, the received data bits are converted into a complex modulated signal, up-converted to an IF frequency, sampled, multiplied by transmit weights obtained from host DSP 331, and converted via digital to analog converters ("DACs") which are part of transmit controller/modulator 337 to analog transmit waveforms. The analog waveforms are sent to the transmit modules 339. The transmit modules 339 up-convert the signals to the transmission frequency and amplify the signals. The amplified transmission signal outputs are sent to antennas 303 via the duplexer/time switch 307.

Remote Terminal Structure

Figure 4:
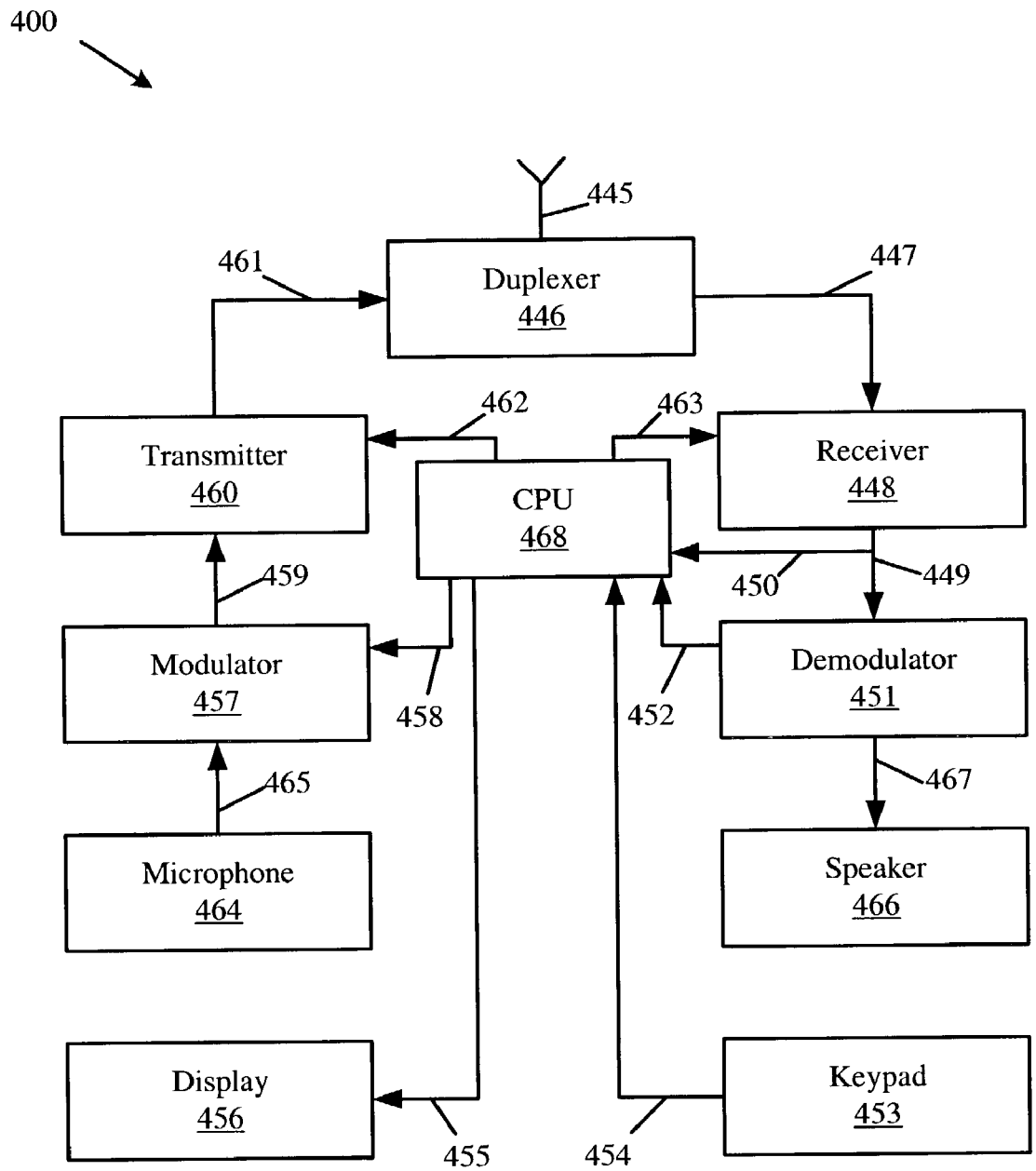
FIG. 4 is a simplified block diagram illustrating a remote terminal on which an embodiment of the invention can be implemented.

FIG. 4 depicts an example component arrangement in a remote terminal 400 that provides data or voice communication. The remote terminal's 400 antenna 445 is connected to a duplexer 446 to permit the antenna 445 to be used for both transmission and reception. The antenna can be omni-directional or directional. For optimal performance, the antenna can be made up of multiple elements and employ spatial processing as discussed above for the base station 500. In an alternate embodiment, separate receive and transmit antennas are used eliminating the need for the duplexer 446. In another alternate embodiment, where time division duplexing is used, a transmit/receive (TR) switch can be used instead of a duplexer as is well known in the art. The duplexer output 447 serves as input to a receiver 448. The receiver 448 produces a down-converted signal 449, which is the input to a demodulator 451. A demodulated received sound or voice signal 467 is input to a speaker 466.

The remote terminal 400 has a corresponding transmit chain in which data or voice to be transmitted is modulated in a modulator 457. The modulated signal to be transmitted 459, output by the modulator 457, is up-converted and amplified by a transmitter 460, producing a transmitter output signal 461. The transmitter output 461 is then input to the duplexer 446 for transmission by the antenna 445.

The demodulated received data 452 is supplied to a remote terminal central processing unit 468 (CPU) as is received data before demodulation 450. The remote terminal CPU 468 can be implemented with a standard DSP (digital signal processor) device such as a Motorola series 56300 Family DSP. This DSP can also perform the functions of the demodulator 451 and the modulator 457. The remote terminal CPU 468 controls the receiver through line 463, the transmitter through line 462, the demodulator through line 452 and the modulator through line 458. It also communicates with a keypad 453 through line 454 and a display 456 through line 455. A microphone 464 and speaker 466 are connected through the modulator 457 and the demodulator 451 through lines 465 and 467, respectively for a voice communications remote terminal. In another embodiment, the microphone and speaker are also in direct communication with the CPU to provide voice or data communications. Furthermore remote terminal CPU 468 may also include a memory element to store data, instructions, and hopping functions or sequences. Alternatively, the remote terminal 400 may have a separate memory element or have access to an auxiliary memory element.

In one embodiment, the speaker 470, and the microphone 464 are replaced or augmented by digital interfaces well-known in the art that allow data to be transmitted to and from an external data processing device (for example, a computer). In one embodiment, the remote terminal's CPU 468 is coupled to a standard digital interface such as a PCMCIA interface to an external computer and the display, keyboard, microphone and speaker are a part of the external computer. The remote terminal's CPU 468 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention is described in the context of TDD (time division duplexing), but the invention is not limited to this context. The invention is also application to wireless systems in which a pilot signal typically is shared among multiple users at the same time, as is commonly required in standards for CDMA (code division multiple access) systems. Current examples of such wireless systems include WCDMA (wideband CDMA), cdma2000; IS-95, and HDR (high data rate) communications. The present system may also be applied to TDMA (time division multiple access) systems such as GSM (global system for mobile communications).

The present invention includes various steps. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the remote terminal. However, many of the steps described as being performed by the base station may be performed by the remote terminal and vice versa.

Furthermore, the invention is equally applicable to systems in which terminals communicate with each other without either one being designated as a base station, a remote terminal, a user terminal, or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using an adaptive antenna array. However, the remote terminals can also contain antenna arrays, and can also perform spatial processing both on receiving and transmitting (uplink and downlink) within the scope of the present invention. Any step or process attributed to the uplink can be instead performed on the downlink and vice versa. Furthermore, in portions of the description above, certain functions performed by a base station could be coordinated across the network, or assigned to other components of the system. The invention does not require the use of adaptive antennas, and may be implemented in any system in which two radios are in communication with each other.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   obtaining data regarding a quality measurement for a signal that is transmitted from a first radio to a second radio;
   obtaining data regarding available power for transmission of the signal by the first radio, the available power for transmission of the signal being a difference between a maximum transmission power level for the first radio and a current transmission power level for the first radio; and
   selecting a transmission mode for the transmission of the signal from a plurality of predetermined transmission modes based at least in part on the quality measurement for the transmitted signal and on the available power for transmission of the signal by the first radio, wherein the selection of the transmission mode includes estimating how much the signal quality can be increased using the available transmission power and determining the data throughput available with the estimated increase in signal quality.

2. The method of claim 1, wherein the information regarding the quality measurement for the transmitted signal comprises a measure of signal to interference plus noise ratio.

3. The method of claim 1, wherein the selected transmission mode comprises signal modulation and signal coding for transmission of the signal.

4. The method of claim 1, wherein each transmission mode in the plurality of predetermined transmission modes relates to predetermined signal quality levels.

5. The method of claim 4, wherein selecting the transmission mode comprises applying the quality measurement data to a lookup table.

6. The method of claim 4, wherein the relation of each predetermined transmission mode to predetermined signal quality levels is based at least in part on frame error rate.

7. The method of claim 1, further comprising modifying transmission power for the first radio based at least in part on the estimation of the increase in signal quality.

8. The method of claim 1, wherein a selection of a transmission mode is performed for each frame of transmission.

9. The method of claim 1, wherein a selection of a transmission mode is performed for every other frame of transmission.

10. A method comprising:
    transmitting a first signal from a first radio to a second radio;
    receiving information regarding a quality measurement for the first signal;
    selecting a transmission mode for the transmission of signals from a plurality of predetermined transmission modes based at least in part on the information regarding the quality of the first signal and on available transmission power for the first radio, wherein the available transmission power is a difference between a maximum transmission power level for the first radio and a current transmission power level for the first radio, and wherein the selection of the transmission mode includes estimating how much the signal quality can be increased using the available transmission power and determining the data throughput available with the estimated increase in signal quality; and
    transmitting a second signal from the first radio to the second radio using the selected transmission mode;
    wherein each transmission mode of the plurality of transmission modes is assigned to a band of signal qualities, each transmission mode having a respective curve providing data throughput versus signal quality values for the transmission mode, wherein the assignment of transmission modes to signal qualities includes comparison of the data throughput versus signal quality curves of the plurality of transmission modes.

11. The method of claim 10, wherein the information regarding the quality measurement for the first signal comprises a measure of signal to interference plus noise ratio.

12. The method of claim 10, wherein each transmission mode of the plurality of transmission modes comprises a modulation scheme and a coding scheme for transmission of a signal by the first radio.

13. The method of claim 10, wherein each transmission mode of the plurality of predetermined transmission modes is mapped to a band of signal quality levels.

14. The method of claim 13, wherein selecting the transmission mode comprises applying the quality measurement information to a lookup table.

15. The method of claim 13, wherein the mapping of each transmission mode of the plurality of predetermined transmission modes is based at least in part on frame error rate.

16. The method of claim 10, further comprising modifying transmission power for the first radio based at least in part on the estimation of the increase in signal quality.

17. The method of claim 10, wherein a selection of a transmission mode is performed for each frame of transmission.

18. The method of claim 10, wherein a selection of a transmission mode is performed for every other frame of transmission.

19. The method of claim 10, wherein the assignment of transmission modes to signal qualities provides for assigning a highest data throughput for a signal quality that meets one or more requirements.

20. The method of claim 19, wherein the one or more requirements include the choice of a transmission mode that is within a gradually increasing portion of a data throughput versus signal quality curve.

21. A method comprising:
receiving a signal from a first radio at a second radio;
measuring a quality for the signal;
receiving information regarding available transmission power for the first radio, the available transmission power being a difference between a maximum transmission power level for the first radio and a current transmission level for the first radio;
selecting a recommended transmission mode for the first radio from a plurality of predetermined transmission modes based at least in part on the quality measurement for the signal and the available transmission power for the first radio, wherein the selection of the transmission mode includes estimating how much the signal quality can be increased using the available transmission power and determining the data throughput available with the estimated increase in signal quality; and
transmitting information regarding the recommended transmission mode from the second radio to the first radio.

22. The method of claim 21, wherein the quality measurement for the first signal comprises a measure of signal to interference plus noise ratio.

23. The method of claim 21, wherein the selected transmission mode comprises a modulation scheme and a coding scheme for transmission of the signal.

24. The method of claim 21, wherein each transmission mode in the plurality of predetermined transmission mode is mapped to a band of signal quality levels.

25. The method of claim 24, wherein selecting the recommended transmission mode comprises applying the quality measurement data to a lookup table.

26. The method of claim 24, wherein the mapping of each transmission mode of the plurality of predetermined transmission modes is based at least in part on frame error rate.

27. The method of claim 21, further comprising modifying transmission power of the first radio based at least in part on the estimation of the increase in signal quality.

28. The method of claim 21, wherein a selection of a recommended transmission mode is performed for each frame of transmission.

29. The method of claim 21, wherein a selection of a transmission mode is performed for every other frame of transmission.

30. A first radio unit comprising:
a transmitter to transmit a signal to a second radio unit;
a receiver to receive from the second radio unit a quality measurement data for the transmitted signal; and
a processor to select a transmission mode for the first radio unit from a plurality of predetermined transmission modes based at least in part on the signal quality measurement data received from the second radio unit and on available transmission power for the first radio unit, wherein the available transmission power for the first radio unit is a difference between a maximum transmission power level for the first radio unit and a current transmission power level for the first radio unit, and wherein the selection of the transmission mode includes estimating how much the signal quality can be increased using the available transmission power and determining the data throughput available with the estimated increase in signal quality.

31. The first radio unit of claim 30, wherein the first radio unit comprises a base station.

32. The first radio unit of claim 31, wherein the second radio unit comprises a remote terminal.

33. The first radio unit of claim 30, wherein the selected transmission mode comprises a modulation scheme and a coding scheme.

34. The first radio unit of claim 30, wherein each transmission mode of the plurality of predetermined transmission modes is mapped to a band of signal quality levels.

35. The first radio unit of claim 34, wherein selecting the transmission mode comprises applying the quality measurement data to a lookup table.

36. The first radio unit of claim 34, wherein the mapping of each transmission mode of the plurality of predetermined transmission modes is based at least in part on frame error rate.

37. The first radio unit of claim 30, wherein the first radio unit increases transmission power based at least in part on the estimation of the increase in signal quality.

38. The first radio unit of claim 37, wherein the first radio unit increases the transmission power of the first radio unit to allow selection of a higher transmission mode.

39. The first radio unit of claim 30, wherein a selection of a transmission mode is performed for each frame of transmission.

40. The first radio unit of claim 30, wherein a selection of a transmission mode is performed for every other frame of transmission.

41. The first radio unit of claim 30, wherein the signal quality measurement data comprises a measure of signal to interference plus noise ratio.

42. A first radio unit comprising:
a receiver to receive a wireless signal transmitted by a second radio unit and data regarding available transmission power of the second radio unit, the signal being transmitted according to one of a plurality of predetermined transmission modes;
a processor to measure a quality of the signal received from the second radio unit and to select a recommended transmission mode for the second radio unit from a plurality of predetermined transmission modes, the determination of the recommended transmission mode being based at least in part on a measurement of the quality of the signal received from the second radio unit and on available transmission power of the second radio unit, wherein the available transmission power is a difference between a maximum transmission power level for the second radio unit and a current transmission power level for the second radio unit, and wherein the selection of the transmission mode includes estimating how much the signal quality can be increased using the available transmission power and determining the data throughput available with the estimated increase is signal quality; and a transmitter to transmit the recommended transmission mode to the second radio unit;

wherein each transmission mode of the plurality of transmission modes is assigned to a band of signal qualities, each transmission mode having a respective curve providing data throughput versus signal quality values for the transmission mode, wherein the assignment of transmission modes to signal qualities includes comparison of the data throughput versus signal quality curves of the plurality of transmission modes.

43. The first radio unit of claim 42, wherein the first radio unit comprises a base station.

44. The first radio unit of claim 43, wherein the second radio unit comprises a remote terminal.

45. The first radio unit of claim 42, wherein each transmission mode of the plurality of transmission modes comprises a modulation scheme and a coding scheme.

46. The first radio unit of claim 42, wherein each predetermined transmission mode is mapped to a band of signal quality levels.

47. The first radio unit of claim 46, wherein selecting the transmission mode comprises applying the quality measurement data to a lookup table.

48. The first radio unit of claim 46, wherein the mapping of each predetermined transmission mode is based at least in part on frame error rate.

49. The first radio unit of claim 42, wherein the first radio unit recommends an increase in transmission power for the second radio unit in connection with a recommendation of a higher transmission mode.

50. The first radio unit of claim 42, wherein a selection of a recommended transmission mode is performed for each frame of transmission.

51. The first radio unit of claim 42, wherein a selection of a recommended transmission mode is performed for every other frame of transmission.

52. The first radio unit of claim 42, wherein the signal quality measurement comprises a measure of signal to interference plus noise ratio.

53. The first radio unit of claim 42, wherein the assignment of transmission modes to signal qualities provides for assigning a highest data throughput for a signal quality that meets one or more requirements.

54. The first radio unit of claim 53, wherein the one or more requirements include the choice of a transmission mode that is within a gradually increasing portion of a data throughput versus signal quality curve.

55. A first radio unit comprising:
a transmitter to transmit a signal to a second radio unit, the signal including data regarding available transmission power of the first radio unit, wherein the available transmission power for the first radio unit is a difference between a maximum transmission power level for the first radio unit and a current transmission power level for the first radio unit;

a receiver to receive data from the second radio unit regarding a recommended transmission mode for the first radio unit, the recommended transmission mode being selected from a plurality of predetermined transmission modes based at least in part on a measurement of the quality of the signal as received by the second radio unit and on the available transmission power of the first radio unit, wherein the selection of the transmission mode includes estimating how much the signal quality can be increased using the available transmission power and determining the data throughput available with the estimated increase in signal quality.

56. The first radio unit of claim 55, wherein the first radio unit comprises a remote terminal.

57. The first radio unit of claim 56, wherein the second radio unit comprises a base station.

58. The first radio unit of claim 55, wherein the selected transmission mode comprises a modulation scheme and a coding scheme.

59. The first radio unit of claim 55, wherein each transmission mode of the plurality of transmission modes is mapped to a band of signal quality levels.

60. The first radio unit of claim 59, wherein selection of the recommended transmission mode by the second radio unit comprises applying the quality measurement data to a lookup table.

61. The first radio unit of claim 59, wherein the mapping of each predetermined transmission mode is based at least in part on frame error rate.

62. The first radio unit of claim 55, wherein the recommended transmission mode is based at least in part on the estimation of the increase in signal quality.

63. The first radio unit of claim 62, wherein the second radio unit recommends an increase in transmission power for the second radio unit in connection with a recommendation of a higher transmission mode.

64. The first radio unit of claim 55, wherein a selection of a recommended transmission mode is performed for each frame of transmission.

65. The first radio unit of claim 55, wherein a selection of a recommended transmission mode is performed for every other frame of transmission.

66. The first radio unit of claim 55, wherein the signal quality measurement comprises a measure of signal to interference plus noise ratio.

* * * * *